Nov. 20, 1956 F. H. RAYMOND 2,771,244

CODED PULSE CIRCUITS FOR MULTIPLICATION

Filed April 23, 1951 3 Sheets-Sheet 1

Inventor:
François Henri Raymond;
By his attorneys,
Baldwin & Wight

Nov. 20, 1956 F. H. RAYMOND 2,771,244

CODED PULSE CIRCUITS FOR MULTIPLICATION

Filed April 23, 1951 3 Sheets-Sheet 2

Inventor:
François Henri Raymond.
By his attorneys,
Baldwin & Wight

Nov. 20, 1956 F. H. RAYMOND 2,771,244

CODED PULSE CIRCUITS FOR MULTIPLICATION

Filed April 23, 1951 3 Sheets-Sheet 3

Inventor:
François Henri Raymond;
By his attorneys,
Baldwin & Wight

United States Patent Office 2,771,244

Patented Nov. 20, 1956

2,771,244

CODED PULSE CIRCUITS FOR MULTIPLICATION

François Henri Raymond, Le Vesinet, France, assignor to Societe d'Electronique et d'Automatisme, Paris, France, a corporation of France

Application April 23, 1951, Serial No. 222,385

Claims priority, application France May 3, 1950

8 Claims. (Cl. 235—61)

The present invention relates to improvements in or relating to operator circuits for electric signals which are to be coded in order that their amplitude configurations in relation with time reproduce the correct binary writing of numerical information magnitudes. As a rule, such signals appear in the form of timed impulse trains of N moments representing by the absence and presence of impulses of a level arbitrarily selected as unity in said moments, the terms of the development in binary series numeration of said magnitudes, viz:

$$a_0+a_1.2+a_2.2^2+ \ldots a_{N-1}.2^{N-1}$$

Owing to the fact that the base of numeration is equal to 2 it is clear enough that any magnitude will be written while choosing for the coefficients $a_0,a_1,a_c \ldots a_{N-1}$ of the terms of the orders 0, 1, 2 . . . $N-1$, those of the values 0 and 1 which provide, through their distribution in the development, a sum of terms equal to the desired numerical magnitude.

Of course, such electric impulse coded trains may reproduce such developments in either direction of their reading, either in the direction of the increasing orders, the first moment of the train in time being that of weight 1, thus representing the term of order 0, the second moment of the train being that of weight 2, thus representing the time of order 1, and so on, or in the direction of the decreasing orders, the first moment being that of weight $2^{N-1}$, thus representing the time of order $N-1$, the second moment of the train being that of weight $2^{N-2}$, thus representing the time of order $N-2$, and so on.

When two or more coded trains of this kind are mixed or combined, for example for the purpose of adding or multiplying their codes, the train directly resulting from this mixing or combination is, in its initial appearance, incorrectly coded in that various other amplitude levels than the levels 0 and 1 appear in its moments. Such an initial appearance must be corrected through an operation and carrying over of the values kept back. Applicant, in United States patent application Serial No. 138,792, filed January 16, 1950, under the title "Method and Carry Over Device for Correcting a Coded Train of Electric Impulses," now Patent 2,689,683, dated September 21, 1954, has, for example, disclosed circuits for this purpose concerning both directions of transmission of the coded trains, with high weights at the end or at the start. Such circuits were denominated "carry over operators" and applicant disclosed, furthermore, that a complete correction could be progressively performed through a cascade arrangements of operators, individually adjusted in order to correct only double and triple levels of a unity level in the mixings and combinations of coded trains; these latter circuits, that is elementary carry over operators, essentially consist of a stage detecting a level higher than the unity which, when energized, delivers two impulses: one of a level double that of the unity which is deducted from the analyzed impulse, and the other of unity level which is additively carried over on the impulse of the order moment immediately above the order of the analyzed impulse, in the expression of the binary development represented by the train being rectified.

Moreover, in applicant's United States patent application Serial Number 143,916, filed February 13, 1950, for "Code Operating Circuits" (now abandoned) applicant showed that coding and code multiplying devices could be realized in a simple manner through the provision of a quadripole with an incorporated delaying line provided with as many equidistant taps as there are moments of the same interval in a train of maximum order to be dealt with, the circuit including impedance branches connected to said taps, the opposed ends of which are connected to a common output connection; in the case of a codification in binary numeration, said impedance, shunts must only operate fully or not at all and accordingly, comprise only such switches as, for example, electronic valves the condition of conductivity of which is modified through a bias change of an electrode; a code is, therefore, registered in the first place on said set of switches through selective locking and unlocking whereafter the reading of the displayed code is performed either through the available terminal of the delay line or through the common connection terminal according to the connection direction of the switches. When the reading signal consists of one simple impulse the resulting coded train carries the registered numerical magnitude; when the coded signal is formed of a precoded train of impulses for carrying a second numerical magnitude, the resulting train carries the initial product of the registered numerical magnitude by the numerical magnitude of the code of the reading train; a correction through an operation and carry over must, therefore, be performed.

The present invention has for its object improvements in such code operators which make it possible directly to obtain at the output of the coding device a train of impulses corrected to amplitude level, and carrying, accordingly, the net result of the operation; said improvements chiefly comprise the combination of a coding device with a delaying line and a cascade of elementary carry over devices each incorporating, in a reciprocal manner, a section between consecutive taps of the line in its circuit. This double combination is effected by connecting on all taps of the coding device delay line, with exception of the first tap in the transmission direction, the analysing and detecting stage of level 2, elementary multiple carry over operator. The outputs of said analysing detecting stage are employed for the reinjection of carry over and cancelling impulses, being fed-back on said delay line, so that the cancelling connections of level 2 should be, in time, at the same locations as the analysis shunts; the carry over connections of said analyzing detecting stage being in locations, the distance of which, in time, in relation with said shunts, is the duration of a moment of the train being simultaneously formed and corrected, said locations being those which appear at the instant of analysis of the mixing terms of the next greater order moment.

In the case of trains which progress in the direction of increasing orders, the moments with the smallest weights at the beginning, the said carry over connections end, in fact, at the taps immediately prior to the analysis taps, and, in the reverse direction, at the taps immediately following, in time; however, in this latter case, a further correction must be provided by the addition in cascade of a complementary stage, which lengthens by a section of time equal to the interval between two taps of the line because the precited combination per se comprises only $(N-1)$ elementary operators in cascade and because the complete correction of a train with N moments which progresses with its terms having the highest weights at the beginning, requires a series of N elementary operators.

In those devices, furthermore, it is preferable to perform the reading by applying the reading signal to the common connection of the impedance shunts.

Said improvements and the code operators which result therefrom will be more clearly understood from the following specification and the accompanying drawings in which.

Figures 1, 2, 3:
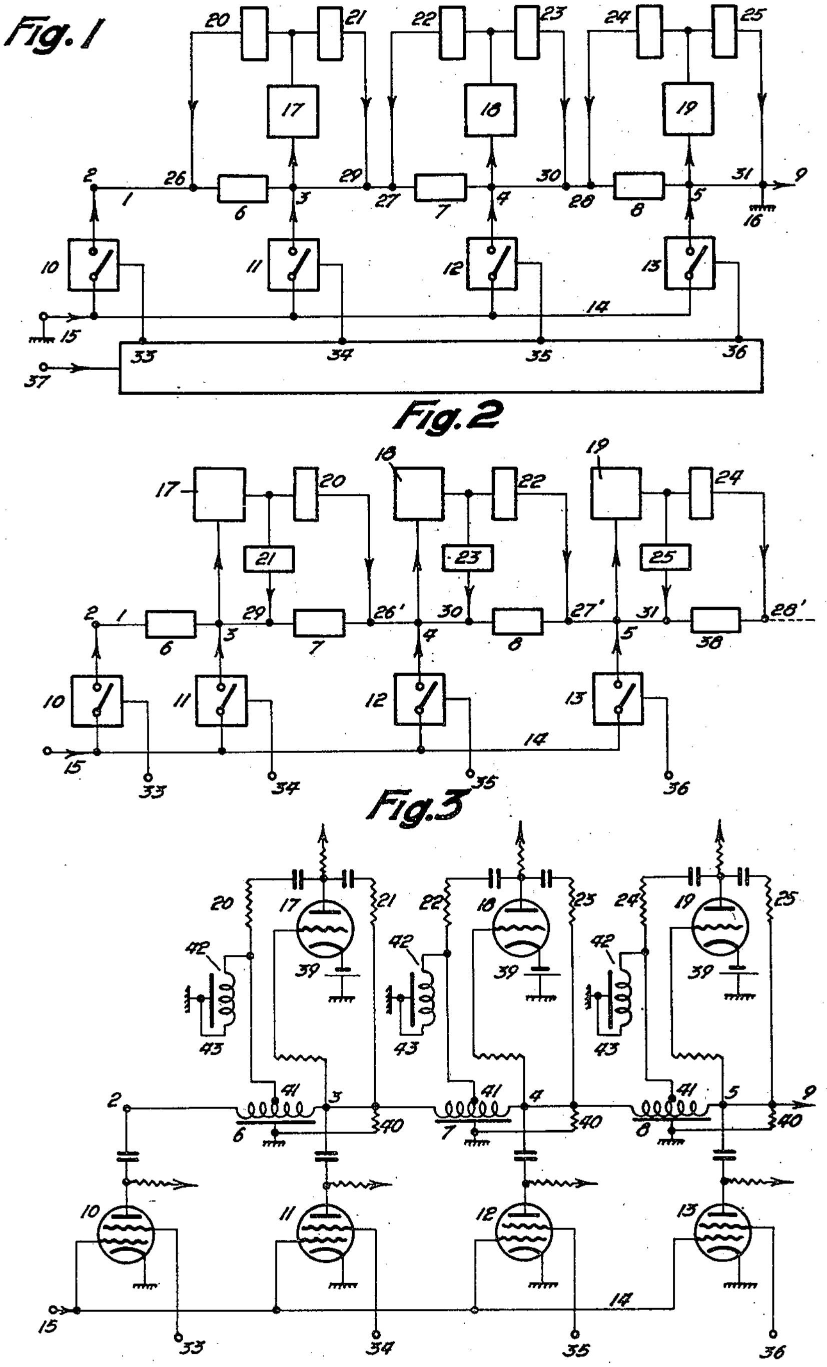
Figs. 1 and 2 show block diagram arrangements in accordance with the invention for coded trains with the moments having the smallest weights appearing first in time (Fig. 1) and the moments having the highest weights appearing first in time (Fig. 2).
Figs. 3 and 4 show two examples of electronic circuits embodying the arrangement of Fig. 1.

Referring to Fig. 1, a delayed transmission circuit is indicated at 1 having four taps 2 to 5 separated by three sections of delay line 6 to 8 of individual electric length $\theta$ designating the duration of a moment of the train under consideration. Reference character 9 indicates the output circuit following the transmission circuit 1 the coded train has its least-significant digits appearing first in time.

Connected to each of the taps 2 to 5 is the output of one of the switches 10 to 13. The inputs of said switches are connected in common to the direct line 14 through terminal 15 to which the reading signal is to be applied. This arrangement then constitutes between input terminals 15 (and earth) and output terminals 16 (and the ground) the codifying quadripole of United States patent application Ser. No. 143,916, supra.

Each of the taps 3 to 5 is, furthermore, in accordance with the present invention, connected to the input of an elementary carry over operator circuit consisting of a threshold stage adjusted in order to be energized only when an impulse of level 2 or higher with respect to a unity impulse level, and fixed, moreover, in an arbitrary manner, appears on said taps. Each of said detectors 17 to 19 of level 2 has its output connected to a pair of members 20—21, 22—23, 24—25; the outputs of members 20, 22, 24 are connected to points 26, 27 and 28 at the input of the sections of delay line 6, 7 and 8; the outputs of members 21, 23, 25 are connected through points 29, 30 and 31 to the outputs of the sections of the delay line. Each of members 20, 22, 24 when energized through its detector stage 17, 18, 19 delivers at 26, 27, 28 respectively a unity level impulse of the same polarity as that of the impulses in course of transmission; each of the members 21, 23, 25 when energized in a like manner delivers at 29, 30, 31 respectively, an impulse of a level double of the unity level but of a reverse polarity in respect to that of the impulses in course of transmission.

Supposing first a code is registered on switches 10 to 13 (which are, for example, actuated manually) and then considering the switches all conducting, any reading impulse applied to 15 will be transferred to taps 2 to 5 at the moment of its appearance. If, at a time $\theta$ later, a second impulse is applied to 15 it will also be transferred to terminals 2 to 5 but the preceding impulses will have shifted by $\theta$ in the delayed path so that the new impulses are added to the prior impulses at taps 3, 4 and 5 and impulses with a double amplitude level appear on said taps. Detectors 17 to 19 operate and apply at 29, 30 and 31 through members 21, 23 and 25 impulses having said double level but of reverse polarity which cancel the existing impulses. At the same time through members 20, 22 and 25 impulses with unity level and with the same polarity as the impulses leaving the switches are carried over to 26, 27 and 28 respectively. At 27 and 28 there remains one unity level impulse and at 26 an impulse the level of which is double that of unity. If, at a time $\theta$ later, a third impulse is applied at 15 the described process is repeated with this difference that an impulse triple of that unity appears at 1 which by means of the mentioned correction leaves at 29 a unity level impulse which through the carry over of the impulse brought back through 27 is brought to level 2, and detector 17 can operate anew in order to carry over a unity level at 26 superimposed on the unity level existing there and to cancel any level at 27, or alternatively the double level impulse will provide at 4, at the following time $\theta$, an impulse with a triple level which will immediately be brought back to the unity level at 30. At 5, there can only appear, as a maximum a level triple of that unity; at 31 (or 16), therefore, only the levels zero and unity can pass on. Therefore, the train will be entirely corrected at the output of the operator.

The registration of the multiplicand code on switches 10 to 13, must be performed, of course, with the smallest weights on the right. The registration control, if it is to be actuated through a precoded train, can be effected by means of a distributor of the type described in United States application Ser. No. 196,286, filed November 17, 1950, for Operating Circuits of Coded Electrical Signals, now Patent 2,635,229, dated April 14, 1954, to François Marie Gloess and François Henri Raymond, assignors to Societe d'Electronique et d'Automatisme, the output taps 33 to 36 from which the registration voltages are extracted, for distribution on switches 10 to 13 of the moments of a coded train applied at 37.

Considering now in Fig. 2, the case of preparing a product train having its moments with the heaviest weights at the beginning, the registration on switches 10 to 13 being effected so that the weights decrease from the right to the left, and the impulses of the multiplying train being applied in the order of their decreasing weights to the switches, it may be seen that it is sufficient to displace the carry over taps 26, 27 and 28 of Fig. 1 and to bring them to the places 26', 27', and 28', Fig. 2, displaced downwardly on the output sides of delay sections 7, 8 and 38, this latter section being added for this purpose. An additional stage in series (not shown) will complete the whole arrangement in order to perform the complete correction of the impressed train with four moments, whence the necessity, as hereinbefore set forth, of an effective series of four carry over operators in such a case. The operation of such an arrangement may be deduced in a direct manner from the operation disclosed for that of Fig. 1, through reversing the direction of the carry over operations from the forward to the rearward position; if for example, an impulse of level 2 exists at tap 3 it is immediately removed at 29 and a carry over of unity impulse is performed at 26'; then if at 4 appears an impulse of level 2 said impulse is brought back to unity level at 30 but a carry over of unity level is performed at 27'; the process is repeated at tap 5 and the carry over unit impulse is brought to 28' where it can be added only to a unity level and, accordingly, a complementary stage will insure the complete correction of a train resulting from the combination of two codes with four moments.

Figure 4:
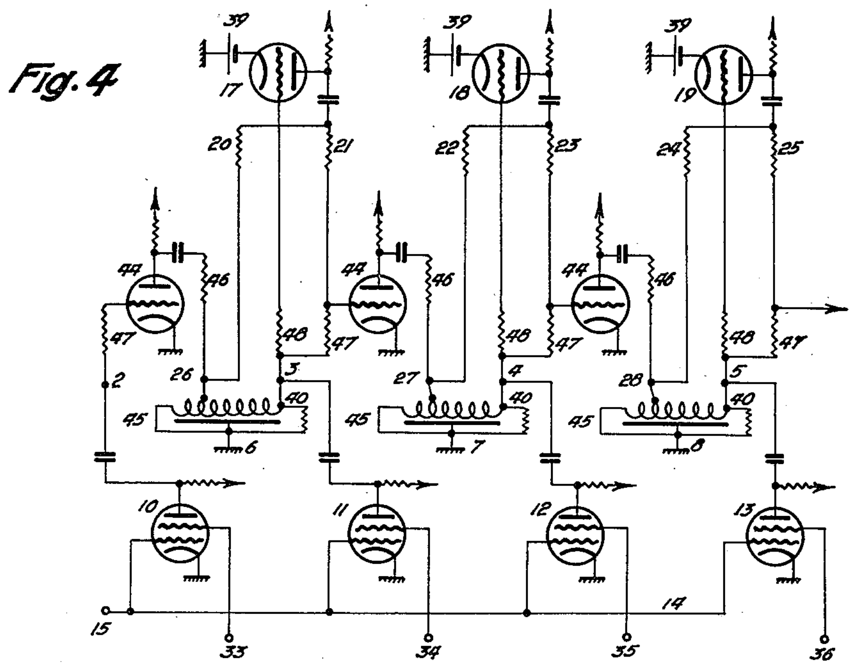
Figure 5:
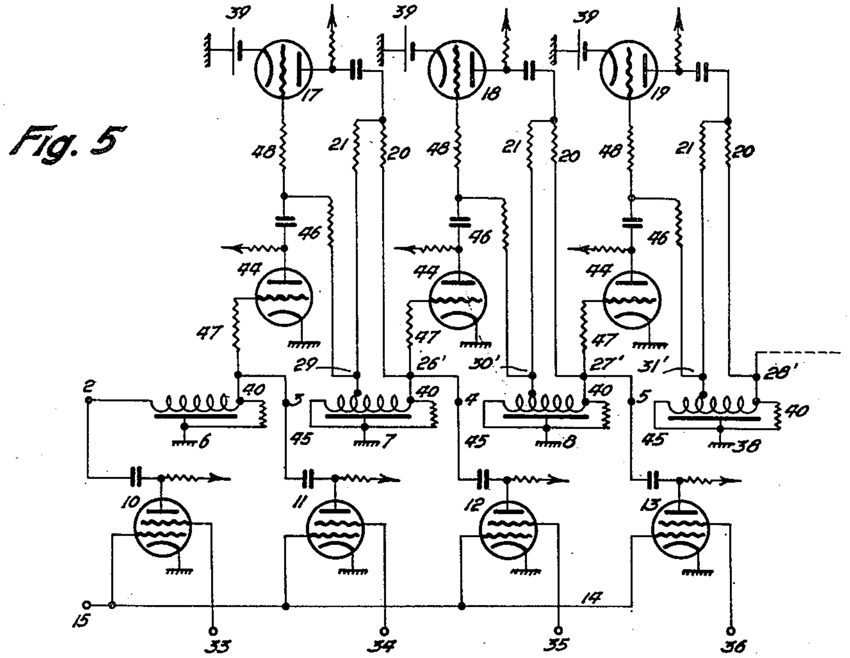
Fig. 5 shows an example of an electronic circuit embodying the arrangement of Fig. 2.

Referring now to Figs. 3 to 5 it may be seen that it is possible in order to utilize such codifying devices to resort to simple circuit elements: switches 10 to 13 consist of valves connected in parallel through their control grids by the successive impulses of the reading signal (multiplier) while the registration is being effected through adjustment of their own conditions of conductivity by selective application of blocking or releasing bias voltages on one of their other electrodes, for example on a second grid; the detecting stages for the levels double or triple of the unity consist, likewise, of valves biased, for example, through their cathodes as indicated at 39 and arranged in order that when blocked at the unity level they are released for levels 2 and 3 (said valves are shown as triodes but in practice they are generally pentodes or other multi-grid valves arranged in order to have such characteristics); members 20 to 25 which calibrate the output impulses leaving valves 17 to 19 at the desired levels for removing and carrying over, may consist of resistors; finally, the relative conditions of polarity which are necessary for a correct operation of the whole arrangement will appear from the following further description of the figures.

In the arrangement of Fig. 3 each section of delay line 6, 7, 8 terminated on its characteristic impedance 40 is provided with an intermediate tap 41 which corresponds, in fact, in each section, to one of the corresponding taps 26 to 28 of Fig. 1, owing to the fact that the electrical length of the line portion between tap 41 and the section input is chosen equal to the total electrical length of an element of delay line 42, short circuited in 43 inserted in the carry over connection after calibrating resistor 20, 22 or 24. Since short-circuit 43 reverses, as it is well known, the polarity of the impulses reflected therein may carry over impulses generated through stage 17 with a polarity reverse of that of the line impulses and is converted into a signal with double polarity through section 42 constituted by two successive impulses one of which, the first, has an incorrect polarity in relation to the carry over and arrives too soon at 41 (direct path) whilst the other, the second, has a polarity reversed at 43, thus correct in relation to the carry over and arrives at 41 at the time when the impulse of the following moment passed-on by valve 10, 11 or 12, also reaches point 41 and is effectively added in amplitude to the latter impulse.

In the example shown as a modification of such an application of the invention as in Fig. 4, each line section 6 to 8 is preceded by a coupling valve 44 which amplifies the signals applied to it while reversing their polarity. Each line section ending in its characteristic impedance 40 has a total duration time $\theta$ but this duration time comprises both the time interval of outward and return transmission of any impulse applied at 26, 27 or 28 on a short-circuit 25; accordingly any applied impulse is converted into a double polarity signal of the character and constitution defined with respect to Fig. 3 for the carry over signal. The operation of the arrangement shown in Fig. 4 may be summarized briefly as follows:

Considering, for example, line section 6 and the operator circuit associated therewith, a negative impulse applied at 2 appears positively at 26 and is converted into a signal of double polarity impulses, and the negative impulse of said signal is added, a time $\theta$ later, to a negative impulse applied at 3. This level 2 impulse is transmitted in parallel to the grids of valves 17 and 44 which, when released, deliver a positive plate impulse. This positive impulse when calibrated at level 2 through the voltage drop in resistor 21, opposes, therefore, the impulse coming from point 3 on input 29 of valve 44 for connection to the following stage, and cancellation is effected. On the other hand, said same positive impulse when calibrated at the level unity through resistor 20 is applied at 29 and added to the positive impulse of the train delivered at the following moment through the first valve 44 and the carry over is performed.

Fig. 5 shows an example of the operator of Fig. 2. The carry over operations must be performed in the transmission direction and, accordingly, valves 17, 18 and 19 are connected through the outputs of coupling valves 44. Section 6 does not require a circuit 45 as provided for the other sections. The operation may be summarized as follows:

Considering, for example, the first carry over operator when two negative impulses delivered through stages 10 and 11 are added at 3, the resulting impulse of level 2 is amplified at 44 and as a positive impulse in the plate circuit. It is applied, on the one hand, onto the grid of valve 17 and, on the other hand, onto the input 29' of the following line section. Valve 17 delivers a negative impulse which, when calibrated at level 2 through resistor 21 is deducted at 21 from the positive impulse of the same level and thus removes it. Said same impulse when calibrated at the level unity in resistor 30 is carried over onto the negative impulse applied at 26' through stage 12 and thus advanced in time by $\theta$. On the contrary, any positive impulse of level unity at 29 is converted into a double polarity signal such as defined above, the negative impulse of which, at the following time $\theta$, is effectively added to the negative impulse delivered at 26' through stage 12 at the output of section 7.

In Figs. 4 and 5 the output resistors of valves 44 and the input resistors of valves 44 and 17—18—19 are indicated at 46, 47 and 48.

In Fig. 3 the multiplicand is of a binary form 1101 which, when being read from right to left like a decimal number the weight of the figures of which is progressive, equals 13. Terminal 36 has received a releasing voltage from tube 13; terminal 35 has received a blocking voltage from tube 12, terminals 34 and 33 receive releasing voltages from tubes 11 and 10.

Any impulse applied to 15 is thus directly transmitted through tubes 13, 11 and 10 to points 5, 3 and 2 of the delay line. The impulse is not transmitted to point 4.

The multiplier is of a binary form 111 which, read in the same manner as hereinbefore explained with respect to the multiplicand, equals 7. The multiplication operation will thus be 13×7=91, which, in binary calculation, reads

```
   1101
 × 111
   1101
  1101
 1101
 122211  gross result
```

The progressive correction is the following:

```
 123011
 131011
 211011
 1011011  net result
```

The multiplier thus consists of three impulses applied at every interval equal to $\theta$ on terminal 15.

Upon the first impulse, tube 13 delivers in 5 an impulse which is directly delivered at the output 9 of the operator. This impulse of unity level of amplitude is also applied to tube 19 but the polarisation thereof does not enable this impulse to be transmitted to the plate of said tube 19.

Tube 11 also delivers an impulse in 3 which is transmitted towards delay element 7. This impulse is furthermore applied to grid of tube 17 but, being of an amplitude of a unity level, is not transmitted to the plate of said tube.

Tube 10 also delivers an impulse in 2, which is transmitted towards delay element 8.

Upon the second impulse of the multiplier in 15, the positions of both impulses remaining in the delay line are the following: the first, and most advanced one is in 4, the following one in 3.

Since the second impulse of the multiplier is applied in 5 by conductive tube 13, a second output impulse is directly delivered in 9.

Tube 12 being non-conductive, the impulse which is in 4 continues toward the right hand side and cannot actuate tube 18 with an amplitude of unity level.

Since tube 11 is conductive, both the impulses delivered at that moment by said tube and those already existing at 3 at the same moment are added to one another: an impulse of a double level results therefrom, which actuates tube 17. Said tube delivers through its plate an impulse of an arbitrary amplitude, but which is limited to a level which is greater than twice the level which has been chosen as a unity. This impulse of greater level is applied to resistor 21 which produces a voltage drop to a level equal to twice the unity. At the input of section 7 of the delay line two impulses then co-exist each of a level equal to twice the unity, but of opposite polarities: these impulses cancel one another.

Since tube 10 is conductive, an impulse is applied in 2 and starts along section 6 of the delay line.

The impulse delivered to the plate of tube 17 is also applied on resistor 20 which brings it back to a level equal to the unity; it is applied with its proper polarity to point 41 of section 6 of the delay line, which transmits it towards the output side. But it is also applied to an additional section of delay line 42 which is shorted and said section 43 will thus return to point 41 of the section of delay line 6 an impulse of a reversed polarity and, therefore, of the same polarity as the impulse which has previously been applied in 2 by the tube 10. The times of travel are chosen in such a manner that in 41 coexist both impulses of the same polarity which are obtained from 2 and from 42; these impulses are added to one another and provide one positive impulse of a level equaling twice the unity, and which travels towards the output side.

Sometime thereafter, chosen for instance at $\theta/2$ after the second impulse of the multiplier has been applied at 15, the situation in the delay line is the following: one positive impulse of a level equal to unity in 41 in the section of delay line 8, one negative impulse in 3 and one positive impulse of a level equal to twice unity in 41. In order to simplify the explanation, the negative impulses will not be further considered (being parasites and being thereafter eliminated in the output train), since it is obvious that none of these negative impulses will be in phase with a code impulse.

Upon the third and last impulse of the multiplier in 15, since tube 13 is conductive, it delivers an impulse which, in 5, is superposed on the positive impulse, the level of which is equal to unity, and which reaches that point at that moment; an impulse results therefrom, the level of which is equal to twice the unity, and which actuates tube 19 which delivers a negative impulse limited to a value which is greater than twice the unity level in its plate. This negative impulse is applied to resistor 25 and is consequently negatively reapplied, with a double level, at 9, where it cancels the positive double-level impulse which is present at this point. The result is that no definite impulse is thus delivered at this third moment of the code on output 9. On the contrary the negative impulse applied at 24 by tube 19 is delayed and its proper polarity is reversed in 42 and will be applied, at the next $\theta/2$ instant, with a positive polarity at 41 wherefrom it proceeds towards output 9 which is reaches at an instant $\theta/2$ later, resulting in an output of an impulse of the product of the fourth moment of the code.

Tube 11 being conductive, an impulse of a level equal to unity is added in 3 and is added to the impulse of a level equal to twice unity which arrives there; an impulse results therefrom, the level of which is equal to three times unity and which actuates stage 17. This stage delivers a negative impulse which is limited as above stated. This impulse is brought back, through resistor 21 to a level equal to twice unity and is thus subtracted from the positive impulse equal to three times unity which is in 3; a positive impulse, of a level equal to unity thus remains in order to be propagated in the delay section 7 in the next moment. On the contrary, through resistor 20, this negative impulse is applied to delay element 42 which delays it of $\theta/2$ and reverses its polarity in order to apply it to point 41.

Tube 10 being conductive, an impulse, the level of which is equal to unity, is applied to 2 and this impulse which is positive, is added in 41 in the delaying section 6, to the carry-over impulse, whence the appearance of an impulse, the level of which is equal to twice unity in 41.

A moment $\theta/2$ after the instant at which the third digit of the multiplier has been applied, the situation is the following in the line: One positive impulse in 41, section 8, one positive impulse in 41, section 7 and an impulse which is twice unity in 41, section 6.

At a moment $\theta/2$ later, at the fourth moment of the code, there is thus an output of product impulses in 9, the level of which is equal to unity and which is thus incapable of actuating stage 19; in 4 arrives an impulse the level of which is equal to unity, also incapable of actuating stage 18; in 3 arrives an impulse the level of which is twice unity.

The latter actuates stage 17, wherefrom a negative impulse is delivered; brought back to a level equal to twice unity in 21, this impulse cancels the double-level impulse in 3; brought back to the level equal to unity in 20, delayed and reversed in 42, it will be applied in 41 section 6 at a moment $\theta/2$ later.

At a moment $\theta$ later, at the fifth moment of the code, at 9 appears the output of a product impulse. In the line, there remains only an impulse of a level equal to unity which then is at point 3.

At a moment $\theta$ later, at the sixth moment of the code, no product output appears, the remaining impulse reaches point 4.

A moment $\theta$ later, at the seventh moment of the code, this remaining impulse appears at output 9 and the operation is completed.

In the circuit of Fig. 4 the same process occurs and considering the same numerical example the operation is as follows:

Upon the first impulse of the multiplier, tube 13 which is conductive delivers at 5 an impulse which appears at output 9. Conductive tube 11 delivers at 3 a positive impulse which, at point 29 is applied to the grid of tube 44, which tube transmits a negative impulse of a level equal to unity in 27. This impulse proceeds on each side of tap 27, the negative portion going towards the right hand side reaches the output of the line in 4 at a moment $\theta/2$; it will be neglected as previously. The positive portion returning at $\theta/2$, through reflection and inversion on short circuit 45, continues to travel and will reach point 4 with a level equal to unity at the instant at which the second impulse of the multiplier is applied. Similarly, a positive impulse will reach point 3 at that instant, issued by a positive multiplier impulse being applied at 2 through conductive tube 10.

Upon the second impulse of the multiplier, conductive tube 13 delivers a product impulse in 9. The impulse which is in 4 is applied to tube 44 at point 30 and passes in delay section 8 where it is treated in the same manner as in section 7. It thus reaches point 5, being positive, at the instant of the third moment of the multiplier code.

In 3, two positive impulses of a level equal to unity are added, one of which comes out of section 6, the other one of which is applied by conductive tube 11. A positive impulse results therefrom, of a level equal to twice unity, stage 39 is actuated and delivers a negative impulse. Through 21, this impulse is added to the positive impulse in 29 and, the levels being the same in arithmetical values, these impulses cancel each other.

Through 20, the negative impulse, brought back to a level equal to unity, is applied to 26 where it is added to the negative impulse then delivered by tube 44 at this point subjected to the action of the positive impulse then being transmitted by tube 10. A negative impulse of a double level results therefrom which, being delayed and reversed in section 6 will reach point 3 at a moment $\theta$ later, to be increased with a new positive impulse delivered by tube 11 in response to the third digit of the multiplier. The operation will be identical apart from resistor 21 bringing back to 29 a negative level which is equal to twice unity, a positive impulse of a level equal to unity remains on tube 44 and is transmitted to 27.

Fig. 5: The same example considered for the circuits of Figs. 3 and 4 is applied to Fig. 5 where tubes 10, 12 and 13 are conductive since the recording is inverted for binary number 1011.

Upon the first impulse of the multiplier, of weight four, the binary number 111 being read in a direction which is opposite to that of the foregoing case, tube 13 applies in 5 a positive impulse of a level equal to unity which is transmitted by tube 44 to delaying section 38 at point 31, with a negative polarity. This delay section will transmit it with its negative polarity and a dephasing of $\theta/2$ in 28' and these parasite impulses will no more be considered; on the contrary, after inversion of its polarity through short circuit 45, it will reach point 28' at a moment $\theta$ later.

The case is the same with regard to the impulse which is transmitted by conductive tube 12, which delivers an impulse which, being treated as hereinbefore explained in relation to tube 44 of the stage of delaying section 8, will reach point 27' (or 5) at a moment $\theta$ later. The impulse delivered by conductive tube 10, which reaches point 3 at a moment $\theta$ later, without having been reversed, section 6 directly ensures this delay.

It would be better to consider the reversed polarities with regard to this figure, on behalf of the detection of levels equalling twice or three times unity. These reversed conditions do not alter the working process in the least and they will be hereafter considered, tubes 10—13 then delivering negatively polarized impulses.

Upon the second impulse of the multiplier, tube 13 delivers a negative impulse in 5 which is superimposed on the negative impulse arriving at this point of section 8 and the polarity of the impulse of double level is reversed by tube 44. It thus actuates tube 19 which, through resistor 20, applies a unity negative impulse in 28' which is added to the negative impulse then present at this point, produced by the moment of the preceding code. A negative impulse of a double level results therefrom. The polarity of this impulse will be reversed by a tube 44 not shown and treated by an additional operator stage, which is also not shown and the constitution of which is similar to any illustrated stage; a tube, such as 17—19 operates in this stage and instantaneously applies a product impulse on the output channel through its resistor 20, while delivering through its resistor 21 a negative impulse in 31 in order to cancel the impulse of double level on the input tap of the additional delay section.

Tubes 12 and 10 respectively deliver at points 5 and 2, two negative impulses.

After the second digit of the multiplier, there will thus be in the line an impulse in 2, one in 3 and one in 4. No output at this moment of the code.

Upon the third digit of the multiplier, tube 13 delivers an impulse in 5 which is added to the output impulse of delaying section 8, whence the above process, causing the output of an impulse of the final stage, which is not shown. But, the following fact should be considered: through tube 12, an impulse is applied in 4 and this impulse meets an impulse coming out from section 7 of the line, stage 18 therefore operates and applies, through its resistor 21, a third impulse equal to unity in 27'. The impulse in 31 is therefore not cancelled by the impulse of double level returned by resistor 21 of stage 19, but is only reduced to a unity level.

On the contrary, stage 18, through its resistor 21, cancels the impulse in 30.

After the third digit, the situation is thus the following in the line: one impulse in 28: delivered at a moment $\theta$ later, one impulse in 31, delivered an instant $2\theta$ later, no impulse in 4, one impulse in 3 which will be delivered an instant $4\theta$ later and one impulse in 2 which will come out one moment $5\theta$ later.

The operation thus provides the output train 1011011 in time, which represents the net product when read from left to right, with the heaviest weights appearing at the beginning of the product.

Many other variations for the performance of the invention may be taken into consideration, more particularly, from the point of view of the relative polarities of the impulses as well as of their at least partial regeneration or re-outlining through the coupling valves controlled for this purpose.

Figure 6:
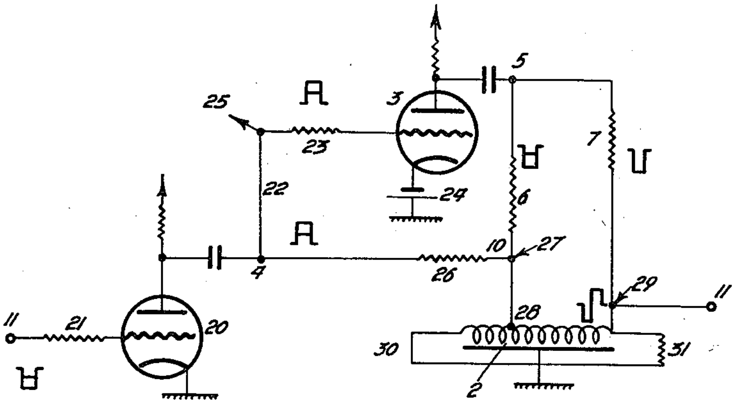
Fig. 6 shows an example of the circuit of a carry over operator arranged according to my invention.

Referring to Fig. 6 a preferred but non limitative example of the construction of a carry over operator is shown, which is capable of being incorporated in one of the units shown in the first figures. The carry over operating stages are separated through the insertion between the output point 11 of the one stage and the connecting point 4 of the following stage of a coupling valve 20. The grid of said valve is connected through a resistor 21 through the impulse signal issued from the preceding stage. This valve has a double function; it acts both as a separating and reversing valve but it may, furthermore, insure the regeneration of the impulses by applying to a second of its grids (not shown in the drawing) recurrent regeneration impulses which are generally available in such operators. It is to be noted, however, that this regeneration must not affect the amplitude of the impulses which pass through the valve, that is to say that valve 20 must cut-off the crest of the signal. Thus, the impulses issued from the preceding stage will be reproduced at 4 but with a reverse polarity and their amplitude will be proportional to that of the impulses at 30. A preferred arrangement of said valve 20 is, for example, that of the negative feed-back type in order to cause said valve to operate as an amplifier valve with a gain equal to unity. The level detector is connected at 4 through the medium of a connection 22 through a resistor 23 so that the applied impulses reach the grid of valve 3 the polarization of which takes place through the cathode.

These impulses arrive at 24 since it is supposed that the impulses at 30 are negative at 11, and thus positive at 4 and become conductive only from a predetermined level such as level 2, for example.

Connection is made to the stage at 25, the detection thresholds of which are multiple in level. The point of multiplication of the detection levels is adjusted at the desired values. Valve 3 allows the impulse coming from terminal 4 to pass while amplifying it when said valve 3 is energized and conductive. The plate impulse of a reversed polarity, i. e. negative in the case under consideration is immediately reapplied at 10 over a path of direct transmission of the impulse which generates the same through a resistor 26. Point 10 and resistor 26 are common to all the operators of one stage as indicated in the drawing at point 27 which shows the multiplying return. However, the impulse in conductor 8 having been brought again, owing to the drop of voltage in resistor 6, to a level below unity said impulse negatives a signal at delaying line 2 in the impulse which arrived at 10. Following the above explanation the resisting impulse can, therefore, only have unity level at the input 28 of delay line 2, the total electrical length of which is $\theta$. On the other hand, the impulse delivered from valve 3 is applied with unity level on to resistor 7. It is immediately reapplied at 11 at the output of the delay line 2 as well as all the other carry over impulses coming from the other possible detectors of one stage as indicated in the drawing through multiplication return point 29. The resulting impulse has a suitable polarity which is negative in the present case in order to be applied directly to the input 11 of the following stage. The impulse which may subsist at 28 at the input of the delay line 2 shows an incorrect positive polarity with respect to the same; in order to reverse its polarity and to bring it to 11, a short-circuit path 30 is provided in the portion of the delay line at one of the ends of this delaying line, the other end being closed on the characteristic impedance. The point of connection 28 is at $$\frac{\theta}{4}$$

of this short-circuit path and, consequently, at $$\frac{\theta}{2}$$

of the output taps.

What I claim is:

1. An operator circuit for binary-coded impulse trains, each having a fixed number of impulse periods, said operator circuit comprising: a static register for the digits of a binary quantity comprising a number of registering members equal to the number of the said impulse periods, a corresponding number of gates controlled by said members; a common application channel for all said gates; a delay transmitting channel; a plurality of taps distributed along said channel, the intervals between said taps being equal to the timing intervals of said trains, each of said taps being connected to the output of one of the said gates and the distribution of said taps along said channel being in registration with the distribution of the controls from said register to said gates; amplitude discriminators for accepting only amplitude levels greater than unity, each said discriminator having its input connected to one of said taps, with the exception of the first tap in the direction of transmission; pulse-cancelling devices coupled between the outputs of said amplitude discriminators and said same corresponding taps; and pulse carry-over devices coupled between the outputs of said amplitude discriminators and the taps in said channel which respectively immediately precede in time the said corresponding taps.

2. An operator circuit for binary-coded impulse trains, each having a fixed number of impulse periods, said operator circuit comprising: a delayed transmission circuit having a plurality of taps spaced thereon and separated by individual delay lines; electronic gating circuits, the outputs of which are individually connected to the respective delay lines; a common input circuit for applying a binary-coded impulse train to said gates; individual control terminals for said gates for respectively applying thereto a digital control voltage; a plurality of amplitude discriminators branched off said spaced taps with the exception of the first tap in the direction of transmission of said circuit, two resistors included in the output circuit of each of said amplitude discriminators, for respectively controlling the output impulses delivered by said discriminators to thereby determine the level of one of the said output pulses so that it appears as a carry pulse, and to determine the level of the other said output pulse so that it appears as a cancelling pulse; means for reversing the polarity of the said carry pulses means for feeding-back said cancelling pulses to the inputs of their own amplitude discriminators; and means for feeding-back the said carry-over reversed pulses to the input of the delay line preceding each corresponding amplitude discriminator.

3. An operator circuit for electrical signals as set forth in claim 1 including series connected resistors for controlling the operation of each of said amplitude discriminators.

4. An operator circuit for electrical signals as set forth in claim 1 which also includes means for reversing the polarity of the outputs applied to the taps on said delay transmitting channel.

5. An operator circuit for electrical signals as set forth in claim 1 in which said gates each consists of multigrid valves including at least a cathode, an anode and a pair of grid electrodes, said grid electrodes being differentially biased for controlling the operation of said circuit.

6. An operator circuit for electrical signals as set forth in claim 1 in which each of said taps includes an inductance capacitatively coupled at opposite ends with said gates and connected at their centers with the registering members and a shunt path from said centers to one end of each of the said inductances.

7. An operator circuit for electrical signals as set forth in claim 1 and additional delay lines individual to each of said amplitude discriminators.

8. An operator circuit for electrical signals as set forth in claim 1 in which said amplitude discriminators each includes an electron tube having at least a cathode, a control grid and an anode, and an additional delay line individual to each of said tubes and comprising an inductance capacitatively coupled at one end with the anode of said tube and at the other end with the cathode thereof.

References Cited in the file of this patent

UNITED STATES PATENTS

| | | |
|---|---|---|
| 2,429,228 | Herbst | Oct. 21, 1947 |
| 2,505,029 | Carbrey | Apr. 25, 1950 |
| 2,560,434 | Gloess | July 10, 1951 |

OTHER REFERENCES

Electronics, "Digital Computer Switching Circuits," C. H. Page; pages 110 to 116, September 1948.